United States Patent [19]

Getz et al.

[11] Patent Number: 4,854,650

[45] Date of Patent: Aug. 8, 1989

[54] TRACK RECOIL AND TENSIONING MECHANISM

[75] Inventors: Marvin G. Getz; Brian D. McFeeters, both of Morton; Robert J. Purcell, Washington, all of Ill.

[73] Assignee: Caterpillar Inc., Peoria, Ill.

[21] Appl. No.: 177,230

[22] Filed: Apr. 4, 1988

[51] Int. Cl.$^4$ .............................................. B62D 55/00
[52] U.S. Cl. ........................................ 305/10; 305/31; 267/64.26
[58] Field of Search ..................... 305/10, 29, 31, 32; 188/305; 267/64.11, 64.13, 64.26, 124; 293/134

[56] References Cited

U.S. PATENT DOCUMENTS

| | | | |
|---|---|---|---|
| 2,837,379 | 6/1958 | Selyem et al. | 305/9 |
| 2,837,380 | 6/1958 | Mazzarins | 305/9 |
| 3,101,977 | 8/1963 | Hyler et al. | 305/10 |
| 3,343,832 | 9/1967 | Gustafsson | 267/64 |
| 3,645,586 | 2/1972 | Piepho | 305/10 |
| 3,787,097 | 1/1974 | Orr | 305/10 |
| 3,792,910 | 2/1974 | Kaufman et al. | 305/10 |
| 3,912,335 | 10/1975 | Fisher | 305/10 |
| 3,915,509 | 10/1975 | Bell et al. | 305/31 X |
| 3,920,286 | 11/1975 | Bell | 305/10 |
| 3,938,851 | 2/1976 | Shelby et al. | 305/10 |
| 3,944,270 | 3/1976 | Kreuzer | 293/134 |
| 4,413,862 | 11/1983 | Ragon | 305/10 |
| 4,457,564 | 7/1984 | Ruge et al. | 305/10 |
| 4,470,583 | 9/1984 | Pieffer et al. | 305/10 X |
| 4,641,872 | 2/1987 | Lohr et al. | 293/134 X |
| 4,681,177 | 7/1987 | Zborowski | 180/9.56 |
| 4,726,631 | 2/1988 | Jones et al. | 305/31 |

FOREIGN PATENT DOCUMENTS 1158379 11/1963 Fed. Rep. of Germany ........ 305/10

Primary Examiner—Robert B. Reeves
Assistant Examiner—Russell D. Stormer
Attorney, Agent, or Firm—Claude F. White

[57] ABSTRACT

A recoil and tensioning assembly for the track and idler of a self-laying track vehicle maintains a constant tensioning force on the endless track. The assembly provides recoiling of the idler wheel during shock loading of the idler wheel or during ingestion of foreign material between the track and the idler and drive wheels. The recoil and tensioning assembly includes a recoil member which telescopes into a cylinder and includes a first chamber filled with a compressible gas and a second chamber filled with a non-compressible oil. A floating piston separates the two chambers and serves to compress the gas during a recoil cycle. Conventional recoil systems for self-laying track-type vehicles utilize pre-compressed large diameter steel coil springs to resist recoiling during light loading of the idler wheel and to return the idler wheel to normal position after recoiling during heavy loading. These coil springs are quite bulky and heavy, require considerable space, and must be maintained in a pre-compressed state under large forces. This requires extremely sturdy spring retaining devices and special assembly and disassembly procedures. The subject recoil and tensioning assembly incorporates a compressible gas spring in place of the large coil steel spring, thereby requiring less space, less weight, and easier assembly and disassembly. The subject assembly maintains a constant tension force on the endless track and responds immediately to recoil situations.

10 Claims, 2 Drawing Sheets

TRACK RECOIL AND TENSIONING MECHANISM

DESCRIPTION

1. Technical Field

This invention relates generally to a recoil and tensioning mechanism for the track assembly of self-laying endless track vehicles and more particularly to a hydropneumatic recoil and tensioning mechanism incorporating a telescoping cylinder having a first chamber filled with a compressible gas, a second chamber filled with a non-compressible oil, and a floating piston separating the two chambers.

2. Background Art

Many conventional earthmoving and construction vehicles utilize self-laying endless metallic track chain assemblies for supporting and propelling the vehicle. The segmented track chain is positively driven by a rear mounted sprocket wheel and guided by a front mounted idler wheel. Some type of subframe, pivotally secured to the vehicle main frame, supports a plurality of track guide rollers and the idler wheel. An idler recoil mechanism is normally incorporated into the subframe behind the idler wheel to provide a relief, or track recoil, function. The recoil mechanism normally utilizes a large steel coil spring which is held in a compressed state within the subframe. When debris, such as rocks or tree limbs, becomes lodged between the track and the idler wheel, or between the sprocket and the track, the idler wheel can retract rearwardly against the force of the compressed steel spring. The force, stored in the compressed spring, returns the idler wheel and track assembly back to their normal operating positions when the debris has passed out of the track assembly.

The conventional earthmoving vehicles, with endless steel track assemblies, are limited to relative low speed operation. Additionally, such vehicles are prohibited from traveling over or upon certain roadways because of the possible damage to the road surfaces by the steel tracks. Recent utilization of frictionally driven endless elastomeric track belts to replace the steel track assemblies has solved the problems of low speed operation and damage to road surfaces. However, conventional recoil and tensioning mechanisms are not satisfactory for the vehicles having frictionally driven endless elastomeric track belts.

A typical track idler recoil assembly for an endless steel track assembly of a track-type vehicle, and the method for installation and removal of a recoil spring, is disclosed in U.S. Pat. No. 3,980,351 issued on Sept. 14, 1976 to Bobby J. Orr, et al. This assembly utilizes a large steel coiled compression-type recoil spring which is compressible between a spring housing and an hydraulic ram. The coil spring is maintained in its compressed state by a retaining member and a pushrod and the hydraulic ram connects the track idler to the compressed spring.

Another type of idler recoil and track adjuster spring retention arrangement, and the method of assembly and disassembly thereof, is disclosed in U.S. Pat. No. 3,920,286 issued on Nov. 18, 1975 to Francis D. Bell. This construction also uses a steel coil compression spring to provide idler recoil and use a threaded member to hold the spring in its compressed state. Both this patent and the above noted patent provide idler preloading and recoil operation using precompressed steel coil springs, which would appear to function satisfactorily for the track-type vehicles illustrated. However, both constructions are heavy and bulky, and require special methods of assembly and disassembly.

Another type of track idler recoil mechanism is described in U.S. Pat. No. 3,912,335 issued on Oct. 14, 1975 to George A. Fisher. This mechanism uses a combination of hydraulic and gas cylinders to replace the steel coil springs used in the previously noted patents. This construction is quite complicated and requires a considerable number of seals and closely machined mating piece parts.

The present invention is directed to overcoming one or more of the problems as set forth above.

DISCLOSURE OF THE INVENTION

In one aspect of the invention, a recoil assembly for controllably resisting movement of an idler of a belted track vehicle includes a cylinder having first and second end portions and an open chamber in said first end portion, an actuator having first and second end portions and an open chamber in said second end portion, with the first end portion of the actuator being connectable to the idler and the second end portion of the actuator being slidably positioned within the cylinder chamber. The recoil assembly further includes a closure having first and second end portions with the first end portion being seated in the second end portion of the cylinder and the second end portion of the closure being slidably positioned within the actuator, and a piston positioned within the actuator chamber.

In another aspect of the invention, a belt tensioning and recoil mechanism for maintaining constant tension on a belt of a belted vehicle which has a drive wheel, an idler wheel, and a frame assembly interconnecting the drive wheel and the idler wheel includes an elongated cavity formed in the frame and defined by a closed bottom wall and side walls and having an opening spaced from the bottom wall, a recoil member including a cylinder having an open end and a closed end, a tubular closure member positioned within the cavity with a first end of the closure member in contact with the bottom wall and a second end of the closure member slidably received within the open end of the recoil member cylinder. A floating piston is positioned within the recoil member cylinder and separates the cylinder into a gas filled recoil chamber and an oil filled belt tensioning chamber.

Adaptation of endless elastomeric belts to earthmoving, construction, and other work vehicles, in place of the conventional multi-jointed steel track assemblies, provides many advantages for the vehicles, including higher speed operation, a quieter operating machine, a smoother ride, and the ability to travel upon improved roadways. However, since the steel track assemblies are generally driven by engagement of powered sprocket teeth with portions of the track and the elastomeric belts are driven by frictional engagement of a powered wheel with the belt, tensioning and recoil requirements for each system are considerably different. For example, although the steel track assemblies require some predetermined degree of tension, they also require a specific amount of "track sag" for proper track adjustment. Therefore, during a recoil cycle and before any actual recoiling can take place, the "track sag" is eliminated. Also, the total amount of recoil movement in a steel track system is generally small, normally between 1 inch and 2 inches.

In contrast, the elastomeric belt track must be tightly tensioned at all times, with substantially no belt sag, because the belt is driven by friction between the driver wheel and the belt. Any decrease in the belt tension force could allow the belt track to slip with a resultant loss in machine mobility and power. Additionally, since there is no sag or looseness in the belt, recoil begins with very little buildup of debris between the belt and idler or drive wheels. It is also desirable to provide considerable more linear recoil movement in the elastomeric belt track than is possible in the steel track systems.

BEST MODE FOR CARRYING OUT THE INVENTION

Figure 1:
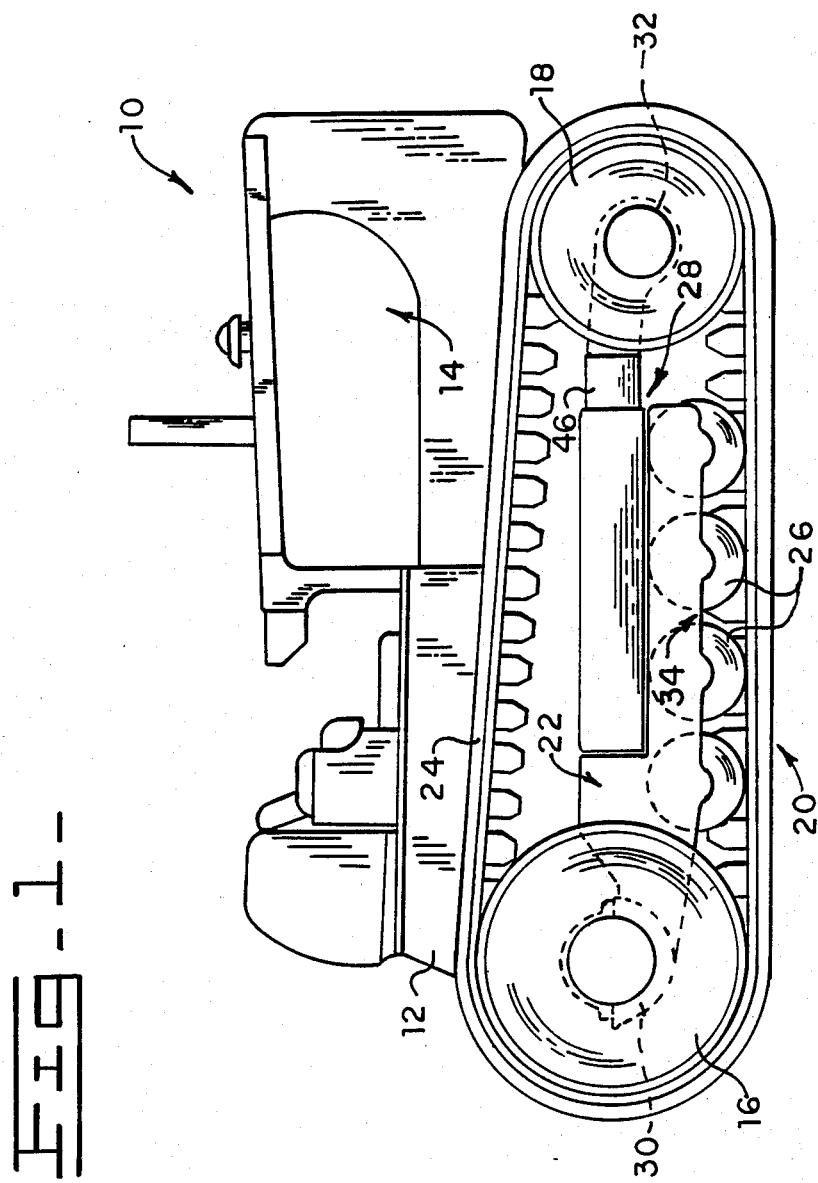
FIG. 1 is a diagrammatic side elevational view of a belted track vehicle incorporating the track recoil and tensioning mechanism of the present invention.

With reference to the drawings, and in particular FIG. 1, a belted track vehicle 10 includes a main frame 12, an engine 14, a friction drive wheel 16 powered by the vehicle, an idler wheel 18 spaced from the drive wheel, and an undercarriage assembly 20. It is to be understood that the drive wheel 16, the idler wheel 18, and the undercarriage assembly 20 are all duplicated on the opposite side of the machine illustrated. The undercarriage assembly 20 includes a roller frame assembly 22, an endless inextendable flexible ground engaging belt 24, a plurality of guide rollers 26, and a hydropneumatic belt tensioning and recoil assembly 28, which maintains substantially constant tension on the belt 24 and controllably resists movement of the idler wheel 18. The roller frame assembly 22 has a first end portion 30 connected to the drive wheel 16 and a second end portion 32 connected to the idler wheel 18. The belt 24 encircles and frictionally engages the drive wheel 16 and the idler wheel 18 and is driven by the frictional engagement of the drive wheel 16. The guide rollers 26 are rotatably secured to the lower portion 34 of the track roller frame assembly 22 and contact the belt 24 between the drive wheel 16 and the idler wheel 18.

Figure 2:
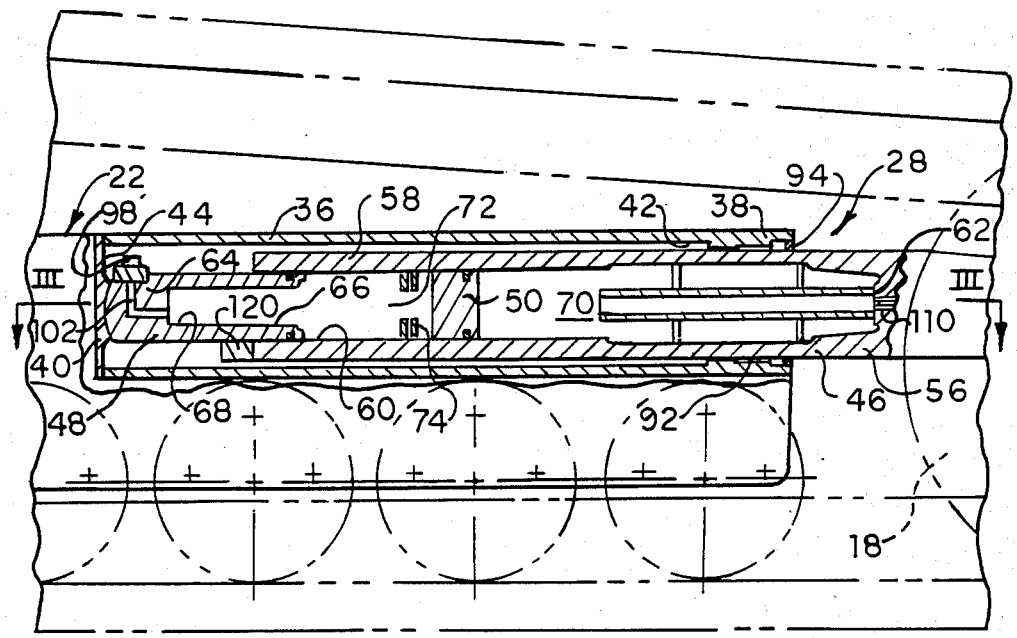
FIG. 2 is a diagrammatic side elevational view, partly in section and on an enlarged scale, of the track recoil and tensioning mechanism of the present invention.
Figure 3:
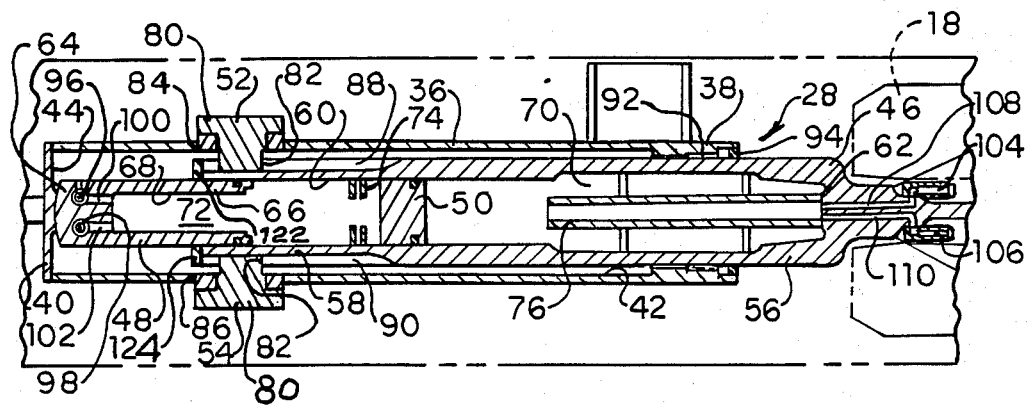
FIG. 3 is a diagrammatic top plan view, taken generally along lines III—III of FIG. 2.

With particular reference to FIGS. 2 and 3, the recoil assembly 28 includes a first tubular member or cylinder 36 having a first end portion 38 and a second end portion 40. The first end portion 38 has an open chamber, or cavity, 42 and the second end portion 40 has a closed end wall 44. The recoil assembly 28 further includes a second tubular recoil member or actuator 46, a tubular closure member 48, a free floating piston 50, and first and second guide member 52 and 54. The actuator 46 has first and second end portions 56,58, with the second end portion 58 having an open-ended cylinder or chamber 60. The first end portion 56 of the actuator 46 forms a closed end 62 for the chamber 60 and is connectable to the idler wheel 18, and the actuator second end portion 58 is slidably positioned within the cylinder chamber 42.

The closure member 48 has a first closed end portion 64 and a second open end portion 66, which forms an open chamber 68. The closure member 48 is positioned within the cylinder cavity 36 with the closed end portion 64 being seated adjacent the end wall 44 and the open end portion 66 being slidably receivable within the chamber 60 of the recoil actuator 6. The floating piston 50 is slidably positioned within the actuator cylinder 60, and, in conjunction with the closure member 48, forms first and second closed chambers 70 and 72. The first chamber 70 is filled with a compressible gas, such as nitrogen, and the second chamber 72 is filled with an non-compressible fluid, such as oil. A first stop assembly 74 is positioned within chamber 72 and a second stop assembly 76 is positioned within chamber 70. The stop assemblies 74 and 76 limit the linear movement of the piston 50 toward and away from the closure member respectively.

The guide members 52 and 54 are substantially similar and each has an enlarged head portion 80 and a smaller guide portion 82. The cylinder 36 has a pair of openings 84 and 86, and the guide portions 82 penetrate these openings 84,86 and extend into the cylinder chamber 42. The second end portion 58 of the actuator 46 has a pair of diametric guide slots 88 and 90, and the guide portions 82 of the guide members 52 and 54 cooperate with the guide slots 88,90 in guiding the actuator 46 during lateral movement of the actuator 46 and idler wheel 18.

The first end portion 38 of the cylinder 36 has guiding means 92 and sealing means 94 on the internal walls of the chamber 42. The guiding means 92 and the sealing means 94 are preferably a bearing 92 and a seal 94. The bearing 92 supports and guides the first end portion 56 during linear movement of the actuator 46. The seal 94 serves to keep foreign material out of the chamber 42.

The closure member 48 has an inlet valve 96 and an outlet valve 98, each communicating with the chamber 72 through the passages 100 and 102 respectively. The actuator 46 also has an inlet valve 104 and an outlet valve 106, each communicating with the chamber 70 through the passages 108 and 110 respectively. Oil can be added to, or deleted from, the chamber 72 by the valves 96 and 98, and compressed gas can be added to, or deleted from, the chamber 70 by the valves 104 and 106.

A stop assembly, in the form of a plate 120 secured to the bottom end of the actuator 46, limits the linear movement of the actuator 46. The stop plate 120 will contact the end wall 44 to limit movement in one direction. A pair of plates 122 and 124, secured to the side walls of the actuator 46 will limit movement of the actuator 46 in the opposite direction.

Industrial Applicability

With reference to the drawings, the subject track recoil and tensioning mechanism is particularly useful for providing a recoil function for the idler wheel 18 of a belted track vehicle 10, and for maintaining proper tension on the flexible belt 24. In the embodiment illustrated, the belted vehicle 10 is supported and propelled by an undercarriage assembly 20, including a drive wheel 16 which frictionally drives a flexible track belt 24. The endless belt 24 encircles the drive wheel 16, the idler wheel 18 and a plurality of guide rollers 26. A roller frame assembly 22 supports the guide rollers and extends between the drive wheel 16 and the idler wheel 18. A recoil assembly 28 connects the idler wheel 18 to the roller frame assembly and provides the recoil function for the idler wheel 18.

With particular reference to FIGS. 2 and 3, the recoil assembly 28 includes an actuator 46 which is connected at 32 to the idler wheel 18. Upon initial assembly of the recoil assembly 28, the floating piston 50 is inserted into the open end of the actuator 46 and into the chamber 60 until it contacts the stop assembly 76. The stop assembly 74 is then secured within chamber 60 and the chamber 70 is charged with a compressed gas, such as nitrogen, through the inlet valve 104. The chamber 70 is pressurized to approximately 1800 PSI (12,400 KPa), which moves the piston 50 against the stop assembly 74. The closure member 48 is then inserted into the chamber 60 and the stop plates 120 are secured to the second end portion 58 of the actuator 46. This assembly is now inserted into the open chamber 42 of the cylinder 36 until the stop plates 120 move past the openings 84 and 86 in the cylinder 36. The guide members 52 and 54 are inserted into the openings 84 and 86, until they contact the guide slots 88 and 90, and are then secured to the walls of the cylinder 36. The actuator is now substantially slidably secured within the cylinder 36. Since there is no pressure in the chamber 72, the actuator 46 can be easily moved into the cylinder chamber 42 in order to facilitate installation of the endless belt 24 around the drive wheel 16, the guide rollers 26, and the idler wheel 18.

With the belt 24 in place, the chamber 72 is pressurized with a non-compressible fluid, such as oil. This fluid is conveyed to the chamber 72 via the inlet valve 96 and the passage 100. While the chamber 72 is being charged, the outlet valve 98 is slightly open to allow air to escape. The outlet valve 98 is closed as soon as the chamber 72 is completely filled with oil and pressurized oil is added until the chamber 72 is pressurized to about 2000 PSI (14,470 KPa). Since the pressure in the chamber 72 is initially higher than the pressure in the chamber 70, the piston 50 is moved out of engagement with the stop assembly 74. Movement of the piston 50 further into the chamber 70 decreases the volume, thereby compressing the gas and increasing the pressure. At some predetermined movement of the floating piston 50 away from the stop 74, the pressure in the chambers 70 and 72 becomes substantially equalized, at approximately 2100 PSI (14,470 KPa). At this point, the closed end of the closure member 48 has moved into engagement with the closed end wall 44 and the actuator 46 has moved outwardly of the chamber 42 to tension the belt 24 between the drive wheel 16 and the idler wheel 18, which is secured to the end 32 of the actuator 46.

This tension force on the belt 24 remains substantially constant as long as the volume of pressurized oil in the chamber 72 remains constant. If the tension force on the belt 24 is to be increased, more oil is added to the chamber 72 through the valve 96. If tension on the belt 24 is to be decreased, oil is removed from the chamber 72 through the valve 98. In view of this, it is apparent that the gas charge in the chamber 70 is not altered in order to increase or decrease the tension force on the belt 24, or even to change the belt 24.

During operation of the vehicle 10, it is important that the tension force on the belt remain substantially constant since the belt 24 is driven by frictional engagement with the drive wheel 16. If the tension force should decrease and the belt 24 becomes slack, slippage would take place between the drive wheel 16 and the belt 24, with a resultant loss of power. A large increase in the tension force could result in damage to the belt or other related components. The recoil assembly 28 prevents the tension force from increasing to a value that would cause such damage. If foreign material becomes lodged between the drive wheel 16 and the belt 24, or between the idler wheel 18 and the belt 24, the belt tension will increase above the preset tension and the actuator 46 will move rearwardly or into chamber 42. This movement of the actuator 46 and the idler wheel 18 will temporarily induce an increased belt tension. As the actuator 46 moves into the chamber 42, the piston 50 remains fixed and the actuator 46 moves relative to the piston 50. This reduces the volume in the chamber 70 and increases the pressure due to further compression of the gas in the chamber 70. When the foreign material is expelled from between the belt 24 and the wheels 16 or 18, the increased pressure in the chamber 70 pushes the actuator 46 and the idler wheel 18 back to its original position and the pressure in the chambers 72 and 70 once again returns to the original setting.

Other aspects, objects and advantages of the present invention can be obtained from a study of the drawings, the disclosure, and the appended claims.

We claim:

1. A recoil assembly for controllably resisting movement of an idler of a belted track vehicle, comprising:
   a cylinder having first and second end portions and an open chamber in said first end portion;
   an actuator having first and second end portions and an open chamber in said second end portion, said actuator first end portion being connectable to said idler and said actuator second end portion being slidably positioned within said cylinder chamber;
   a closure having first and second end portions and an open chamber in said closure second end portion, said closure first end portion being seated in said cylinder second end portion and said closure second end portion being slidably positioned within said actuator chamber;
   a piston positioned within and slidably movable along said actuator chamber; and
   inlet and outlet valves communicating with said actuator chamber, and inlet and outlet valves communicating with said closure chamber.

2. The recoil assembly, as set forth in claim 1, including first and second guide members, said guide members and each having an enlarged head portion and a guide portion, said guide portions adapted to penetrate said cylinder and extend into said cylinder chamber.

3. The recoil assembly, as set forth in claim 2, wherein said second end portion of said actuator has a pair of diametric guide slots and said guide members are adapted to cooperate with said guide slots in guiding said actuator during movement of said idler wheel.

4. The recoil assembly, as set forth in claim 1, including a guide means on the internal walls of said chamber, said guide means adapted to guide said actuator during relative linear motion between said cylinder and said actuator.

5. The recoil assembly, as set forth in claim 4, wherein said guide means includes a bearing.

6. The recoil assembly, as set forth in claim 1, including a first stop assembly positioned within said chamber of said actuator, said first stop assembly adapted to limit movement of said piston toward said closure.

7. The recoil assembly, as set forth in claim 1, including a second stop assembly positioned within said actuator chamber, said second stop assembly adapted to limit movement of said piston toward said first end portion.

8. The recoil assembly, as set forth in claim 1, including a limit stop adapted to limit linear movement of said actuator.

9. An undercarriage assembly for a vehicle having a friction drive wheel powered by said vehicle, and an idler wheel spaced from said friction drive wheel comprising:
- a roller frame assembly having a first end portion connected to said drive wheel and a second end portion connected to said idler wheel;
- an endless inextendable flexible ground engaging belt encircling and frictionally engaging said drive wheel and said idler wheel, said belt being driven by frictional engagement with said friction drive wheel;
- a plurality of guide rollers secured to said roller frame assembly and adapted to contact said belt between said drive wheel and said idler wheel; and
- a hydrophneumatic recoil assembly having a first tubular member having an open end portion and a closed end portion, a second tubular member having an open end portion and a closed end portion and being slidably received within said open end portion of said first tubular member, a closure member positioned within said first tubular member and adjacent said closed end portion, said closure member being slidably received within said open end portion of said second tubular member, a floating piston positioned within said second tubular member and forming first and second closed chambers within said second tubular member, inlet and outlet valves communicating with said first closed chamber, and inlet and outlet valves communicating with said second closed chamber.

10. A belt tensioning and recoil mechanism for maintaining constant tension on a belt of a belted vehicle, said vehicle including a drive wheel, an idler wheel, a frame assembly interconnecting said drive wheel and said idler wheel and including a plurality of guide rollers, comprising:
- a tubular member formed in said frame, said member having a closed end wall and an opening spaced from said end wall;
- a recoil member having first and second end portions, including an open ended cylinder in said second end portion, said first end portion forming a closed end for said cylinder, said second end portion being slidably receivable within said cavity and said first end portion being connectable to said idler wheel;
- a tubular closure member having a closed end portion and an open end portion, said closure member being positioned within said cavity with said closed end portion in abutting relationship with said end wall and said open end portion being slidably receivable within said open end of said recoil member;
- a floating piston positioned within said recoil member cylinder and separating said cylinder into a gas filled recoil chamber and an oil filled belt tensioning chamber;
- first and second stop means within said cylinder for limiting linear movement of said piston toward and away from said closure member; and
- inlet and outlet valves communicating with said recoil chamber and inlet and outlet valves communicating with said belt tensioning chamber.

* * * * *